Jan. 12, 1943.                E. A. LINTON                2,308,290
                           ELECTRIC SWITCHGEAR
                           Filed March 11, 1941
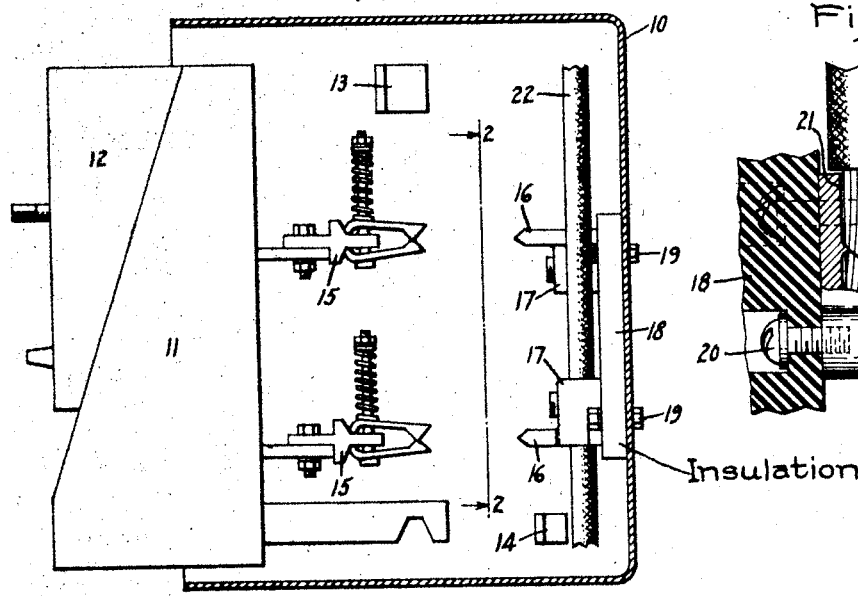
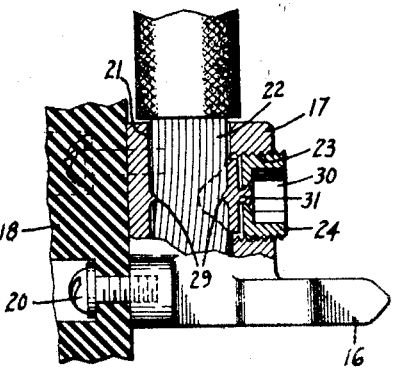
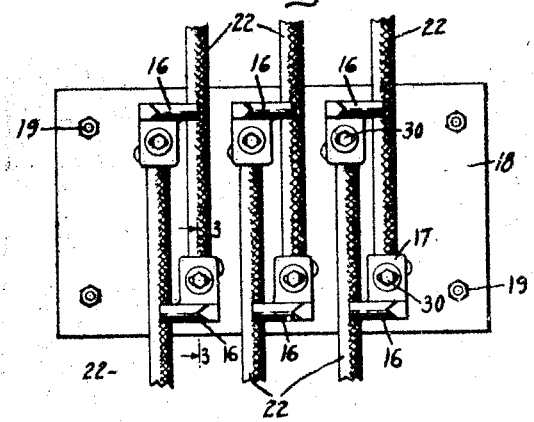
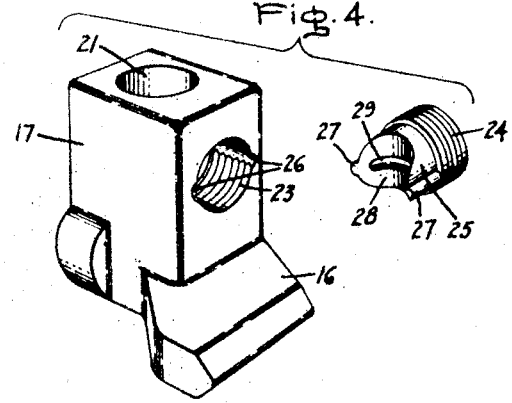
Inventor:
Edwin A. Linton,
by Harry E. Dunham
His Attorney.

Patented Jan. 12, 1943

2,308,290

UNITED STATES PATENT OFFICE 2,308,290

ELECTRIC SWITCHGEAR

Edwin A. Linton, Chews Landing, N. J., assignor to General Electric Company, a corporation of New York Application March 11, 1941, Serial No. 382,829

1 Claim. (Cl. 175—298)

My invention relates to electric switchgear and more particularly to the mounting, housing, and making of electrical connections with electric switches, automatic circuit breakers, and the like, such as is disclosed in United States Letters Patent 1,544,106, granted June 30, 1925, to William M. Scott.

Circuit breakers of the type disclosed in the above-mentioned Scott patent require a so-called "pull box" into which the electric cables connected to the circuit breaker extend. The circuit breaker and its separate enclosure are then supported on this pull box. Structures of this type required a considerable amount of space since both the pull box and a separate circuit breaker housing are required and, furthermore, considerable difficulty in bringing in the cables and making the connections to the circuit breaker are encountered.

It would be desirable to provide an electric circuit breaker in which a separate pull box is not required, thereby decreasing the breaker mounting space. Also, it would be desirable to simplify the electrical connections of such arrangements so that the electric cables can be brought in from either the top or the bottom of the circuit breaker housing and so that these connections both with the circuit breaker and the cables can readily be made.

Accordingly, it is an object of my invention to provide a new and improved electric switchgear which is simple, compact, rugged in construction, and less expensive than prior-art arrangements, wherein electric connections can readily be made and which eliminates the requirements of a pull box heretofore considered essential.

It is a further object of my invention to provide a new and improved electric switchgear which greatly reduces the space required by similar arrangements heretofore and in which electrical connections thereto can readily be made.

It is a further object of my invention to provide a new and improved disconnecting arrangement for electric switchgear in which the electrical connections both to the cables and to the circuit breaker may readily be made.

Further objects and advantages of my invention will become apparent as the following description proceeds and the features of novelty which characterize my invention will be pointed out with particularity in the claim annexed to and forming a part of this specification.

For a better understanding of my invention, reference may be had to the accompanying drawing in which Fig. 1 thereof is an elevational view partly in section of apparatus embodying my invention, Fig. 2 is a sectional view taken on line 2—2 of Fig. 1, Fig. 3 is an enlarged sectional view taken on line 3—3 of Fig. 2, and Fig. 4 is an exploded perspective view of the portion of the apparatus illustrated in Fig. 3.

Referring now to Fig. 1 of the drawing, I have illustrated a housing or box 10 of any suitable material, preferably sheet or cast metal, which, in the example illustrated, serves as a supporting housing and is itself preferably secured to any suitable support, as a wall, pillar, or the like, by any suitable attaching means. Housing 10 serves not only as the pull box of the prior art but also as the housing for an electric circuit breaker as will be described in greater detail hereinafter.

A removable unit generally indicated at 11 including an electric circuit breaker schematically illustrated at 12 is arranged to be suitably supported within housing 10 on supporting lugs 13 and 14. The removable unit 11 is arranged to be moved into and out of the stationary housing 10. Circuit breaker 12 is electrically connected to contacts 15 which are hereinafter referred to as a movable portion of the disconnecting contacts since they are supported by the removable unit 11 and are arranged to engage with the stationary portion 16 of these contacts which comprise an integral offset portion of a solderless terminal lug 17 which will be described in greater detail hereinafter. While the stationary portions 16 of the disconnecting contacts are illustrated as of the male type adapted to engage with the spring pressed jaws of female type contacts 15 associated with the removable unit 11, it will, of course, be understood by those skilled in the art that contacts 15 and 16 making up the disconnecting devices may be constructed in any other suitable manner and the particular embodiment shown is only one of the many arrangements possible.

As is best shown in Figs. 2 and 3, the solderless terminal lugs 17 are arranged to be supported on a slab of insulating material 18, such as slate or the like, which is suitably fastened to the back wall of housing 10 as by supporting screws 19. As best indicted in Fig. 2, two sets of terminal lugs 17 are provided for each phase of the circuit breaker 12 mounted on removable unit 11 and these sets are supported on slab 18 in a predetermined alignment the purpose of which will become apparent from the following description. The portion of the solderless terminal lug 17 abutting against insulating slab 18 is provided with threaded openings so that fastening means such as screws 20, Fig. 3, may be provided to support terminal lug 17 on insulating member 18.

The solderless terminal lug 17 including the offset portion 16 which forms the male member of the disconnecting contacts is provided with a recess 21, best shown in Figs. 3 and 4 to receive a suitable cable, conductor, or circuit wire 22, which is quite frequently of the multistrand type. The diameter of this recess will ordinarily be enough larger than the cable 22 to receive it conveniently, although it will be found that the terminal will accommodate considerably smaller conductors. This recess extends completely through terminal lug 17 so that the cable conductor may enter this recess from either end.

In order that the conductor 22 may be suitably fastened in the recess 21 of solderless terminal lug 17, the body of the lug is provided with a threaded opening 23, Figs. 3 and 4, which is perpendicular to the recess 21. The threaded opening 23 is arranged to receive a clamp screw or nut 24 which is arranged to force a clamp shoe or saddle 25 against conductor 22 to hold it in position. Threaded opening 23 is provided with a pair of parallel grooves 26 which cooperate with side extensions 27 on clamp shoe 25 to guide the clamp shoe in its movement into threaded opening 23 so as to cooperate properly with conductor 22, the clamp shoe 25 being provided with a concave surface 28 preferably having the same radius as that of the recess 21. In order to insure good electrical contact, this concave surface is provided with raised restricted contact surface 29 as is also the wall of recess 21 opposite the inner end of threaded opening 23.

It will be obvious to those skilled in the art that the clamp shoe or saddle 25 should preferably be secured to clamp screw 24 to facilitate retraction and removal of the shoe as well as to keep the parts together. As shown in Figs. 2 and 3, the clamp screw 24 has a central recess 30 for the insertion of a wrench. Preferably, the recess 30 does not extend entirely through the screw and the bottom of this recess is provided with a small opening through which a pivot member 31, integrally attached to clamp shoe 25, extends. Pivot member 31 is preferably formed as a rivet so as to fit loosely in the opening formed in the bottom of recess 30 and yet to prevent separation of clamp shoe 25 and clamp screw 24. When the clamp shoe 25 is forced against the cable by clamp screw 24, all of the force is transmitted directly from one member or the other and pivot member 31 is provided merely to enable clamp shoe 25 to be withdrawn with clamp screw 24. By the arrangement just described, the clamping shoe 25 and clamping screw 24 cannot be accidentally separated or mislaid. Furthermore, if, for any reason, the clamping shoe 25 is wedged or sticks in the opening 23 against the conductor 22, it may be loosened or withdrawn by the usual action of removing the clamp screw 24.

Since the cable or conductor recess 21 of the terminal lug 17 extends completely through the lug, it will be observed that the conductors 22 may be connected to the terminal from either the top or the bottom thereof so that it is possible, in connection with Fig. 1, to bring these conductors in from either the top or the bottom of housing 10. Although, in Figs. 1 and 2, these conductors are illustrated as being brought in from both the top and bottom of housing 10, it will be obvious to those skilled in the art that, with my arrangement, they could equally well all be brought in from the top or all be brought in from the bottom. By making the male members 16 of the disconnecting devices an integral offset portion of the terminal lugs 17, the housing 10 which serves as a pull box also serves as a housing for removable unit 11 and, not only is the expense of a pull box eliminated, but considerable space is saved. The wiring connections can readily be made, thus reducing the installation costs to a considerable extent. In the event that repairs to the circuit breaker are required, it would merely be necessary to remove removable unit 11 and replace it with a similar unit without the need of changing any of the electrical connections.

While I have shown and described a particular embodiment of my invention, I do not desire my invention to be limited to the construction shown and described for, of course, it will be obvious to those skilled in the art that changes and modifications may be made without departing from my invention and I, therefore, aim in the appended claim to cover all such changes and modifications as fall within the true spirit and scope of my invention.

What I claim as new and desire to secure by Letters Patent of the United States is:

An electric disconnecting device for use in electric switchgear of the type comprising a stationary housing, a removable unit including a circuit breaker arranged to be moved into and out of said housing; which comprises at least two sets of cooperating members, a first member of each set being supported by said housing in a predetermined alignment with the corresponding member of another set and the second member of each set being supported by said removable unit, the said first members of said sets each comprising a solderless terminal lug having a body secured in said housing, said body having a conductor cable recess arranged therein, said first members of said sets also being so arranged in said housing that connections thereto can be made with cables entering said housing from either of two substantially opposite directions corresponding to the said direction of alignment of said first members, and an offset portion on the body of each of said first members for making removable electrical connection with the cooperating second member of each of said sets upon movement of said removable unit into said housing, said arrangement being such that a cable connected to one of said first members of a set from either of said substantially opposite directions will clear the corresponding member of said other set in said predetermined alignment therewith.

EDWIN A. LINTON.